United States Patent

[11] 3,583,221

| [72] | Inventors | Albert D. Ehrenfried<br>Norton T. Pierce, both of Concord; Louis<br>Mager, Sudbury; Floyd E. Halstead,<br>Maynard, all of, Mass. |
|---|---|---|
| [21] | Appl. No. | 813,943 |
| [22] | Filed | Apr. 7, 1969 |
| [45] | Patented | June 8, 1971 |
| [73] | Assignee | Metritape, Inc.<br>West Concord, Mass. |

[54] DRY BULK LEVEL SENSING SYSTEM
13 Claims, 9 Drawing Figs.

| [52] | U.S. Cl. | 73/301 |
|---|---|---|
| [51] | Int. Cl. | G01f 23/18 |
| [50] | Field of Search | 73/301, 304; 200/61.2, 61.21 |

[56] References Cited
UNITED STATES PATENTS

| 3,153,342 | 10/1964 | Pierce et al | 73/301 |
| 3,290,462 | 12/1966 | Watkins | 200/61.21 |
| 3,401,562 | 9/1968 | Reaney | 73/301 |

*Primary Examiner*—S. Clement Swisher
*Assistant Examiner*—Denis E. Corr
*Attorney*—Joseph Weingarten ABSTRACT: A system for the accurate and consistent determination of the level of dry bulk solid materials and capable of withstanding the unusual forces exhibited by such materials stored in vessels. An elongated level sensor is disposed within a mass of dry solid material and is operative to provide a resistance of a magnitude which varies in relation to the level of the surrounding material, and associated circuitry is provided for converting the resistance measurement to an indication of level.

INVENTORS
NORTON T. PIERCE
ALBERT D. EHRENFRIED
LOUIS MAGER
FLOYD E. HALSTEAD

ATTORNEYS

INVENTORS
NORTON T. PIERCE
ALBERT D. EHRENFRIED
LOUIS MAGER
FLOYD E. HALSTEAD
ATTORNEYS

PATENTED JUN 8 1971 3,583,221

INVENTORS
NORTON T. PIERCE
ALBERT D. EHRENFRIED
LOUIS MAGER
FLOYD E. HALSTEAD
BY
ATTORNEYS

DRY BULK LEVEL SENSING SYSTEM

FIELD OF THE INVENTION

This invention relates to measuring systems and more particularly to systems for measuring the level of dry bulk materials in an extremely efficient manner and in a manner substantially immune to forces exhibited by dry bulk materials in storage.

BACKGROUND OF THE INVENTION

Major problems exist in the measurement of dry bulk solids in large part by reason of the complexity and unpredictability of pressures and flow patterns within the mass of dry particulate material. The situation is aggravated by the uncertainties of the theory of dry solid flow and the manner in which vessels, hoppers, orifices, and piping should be designed to operate under varying dry material conditions. As used herein, the term "dry solids" is employed in a broad sense to describe a wide range of materials which are nonliquid in nature and which have varying degrees of interparticular friction, pressure and energy absorption and which, because of such internal friction, do not form a uniform flat surface when poured freely onto a flat plane; that is, the materials exhibit a defined angle of repose. Within the wide range of dry solids there can be smooth pellets, coarse aggregates, flake-shaped particles, and powders of varying degrees of fineness.

The storage and flow of such varying particle geometries may also be greatly affected by the specific materials inherent coefficient of friction, moisture content, bulk density, electrostatic charge generation and attraction, and tendency of the particles to geometrically interlock with one another. Other factors which affect the storage and flow of dry solids are the velocity and inflow patterns by which the particles are introduced into a storage vessel, the geometry and inside wall friction of the vessel, the physical means and velocities with which the material is removed from storage, and the duration of time in which the material has remained in storage and been subjected to consolidation or of compaction.

The poor fluidity of dry solid materials can often result in the materials moving only with great difficulty in and out of the storage vessel and, in many instances, such movement must be induced through the use of air pressure jets, tank vibrators, or special contouring of inlet and outlet orifices. Such poor material fluidity can cause extremely high pressures and stresses to develop within the mass of stored material, these pressures being capable of sufficient magnitude to cause damage to the storage vessel and to components which may be mounted therein.

Nonhomogeneous pressures and force patterns can result in regions of extremely high stress, while in other regions zero pressure occurs. These force patterns thus make it impossible to use liquid-level measurement techniques involving point-located pressure receiving devices. And, as described above, regions of high pressure stress can cause high crushing and friction forces to be imparted to vessel walls or to any elements mounted or suspended therein, such as heat-sensing cables, for example, mounted within the dry bulk mass.

Certain dry solid materials such as flakes, powders, fibers, and grains and meals are particularly susceptible to problems of compression and compaction. And, in addition to the nonhomogeneous pressure fields resulting within dry solids generally, there may be additional variations in material density and pressure distribution by reason of material settling or consolidation of the materials in storage, particularly when subjected to the considerable weight of material which may be carried within a tall storage vessel.

The pressure fields within a dry material mass varies greatly during material loading, or inflow, and during material unloading, or outflow. For example, as a stored dry material mass is first withdrawn from its storage vessel, there are substantial transient forces developed, known as "switch forces," which result from the momentary realignment of pressure vectors from the "loading" pressure field to the "unloading" pressure field. These switch forces can have a very destructive effect upon the storage vessel and elements contained therein.

Many dry solid materials develop static charges, particularly those materials which are good electrical insulators and which have low moisture content. Such charges cause interparticle attraction and thus affect the flow and storage properties of the materials. Moreover, the stored static charge can release electrostatic energy capable of burning out electronic elements or circuits.

The high tensile stresses within a material mass can be extraordinary especially during initial material outflow after a substantial period of material storage and consolidation. As material is initially removed from the bottom of the vessel, the great mass of material in the upper portions thereof may move as a single consolidated charge, causing extremely high peak stresses. Such peak stresses may be of short duration being relieved as the material mass begins to break up and fluidize. Measurements made on cables suspended in wheat bins have shown tensile forces ranging from one to two tons for cable lengths of 100 to 150 feet.

This complex combination of material properties and storage conditions renders the determination of dry solid level in a storage vessel exceedingly difficult. It will be appreciated that any system must meet very stringent requirements to be capable of accurately measuring the level of dry solid materials in a storage vessel and also capable of withstanding the widely varying forces and other conditions found in actual storage systems.

SUMMARY OF THE INVENTION

In accordance with the present invention, a system is provided for the consistent and accurate determination of level of dry solid materials without error or damage to the level sensors due to the unusual forces exhibited by such materials stored in vessels such as bins or silos. The system employs a unique level sensor described and claimed in U.S. Pat. No. 3,153,342 and in copending application Ser. No. 739,868, filed June 25, 1968, now Pat. No. 3,511,090 both assigned to the assignee of the present invention. The system is specially constructed and operative to withstand the unusual conditions encountered in the storage of dry solid materials and to provide precise and uniform level determination in the presence of such unusual conditions. The system includes an elongated level sensor of small cross section disposed vertically within the mass of dry solid material to be measured. The sensor is operative to provide a resistance the magnitude of which varies in direct relation to the level of materials surrounding the sensor, and associated electronic circuitry can be provided to convert the variation in electrical resistance to an indication of material level. The sensor comprises a high tensile strength electrically conductive base strip, which typically is in part surrounded by an electrically insulative material which exposes a portion of the length of one side of the base strip for contact by a precision resistance wire of suitable cross section, helically wound around the insulated base strip. A flexible multielement jacket of high tensile strength closely surrounds the structure just described, the jacket being, however, very sensitive to surrounding pressure. The jacket provides protection to the inner electrical system of the sensor, while acting as an efficient pressure sensitive diaphragm for forcing the resistance wire against the base strip. The jacket is substantially impermeable to moisture and abrasion resistance, and integrity of form even when subjected to temperature, pressure, and force extremes.

The elongated sensor is disposed within the mass of dry solid material in a position spaced from the longitudinal axis of the storage vessel for reasons which will be explained hereinbelow, and the sensor is mounted in free-hanging form by a specially constructed mounting assembly usually fastened to the roof of the storage vessel. The mounting assembly is operative to permit pivotal movement of the sensor with forces caused by the moving material mass, and may contain compliant means for absorbing transient forces occuring in certain storage installations. The system also includes means for equalizing pressure variations between the internal sensor chamber and the external environment, while preventing moisture from entering the sensor chamber in a manner that could cause improper system performance and electrical contact degradation.

DESCRIPTION OF THE DRAWINGS

The invention will be more fully understood from the following detailed description, taken in conjunction with the accompanying drawings in which.

DETAILED DESCRIPTION OF THE INVENTION

Figure 1:
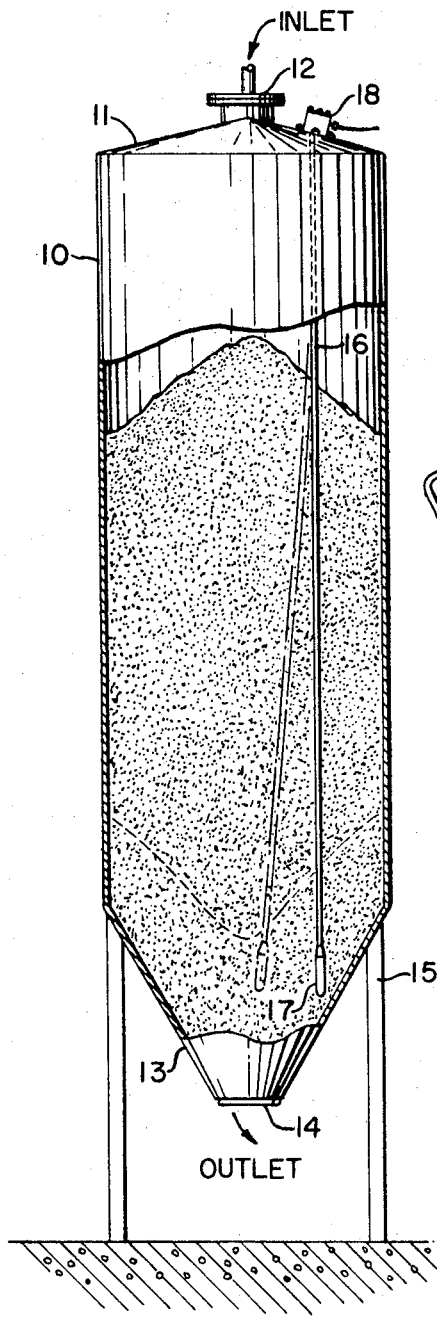
FIG. 1 is an elevation view, partly in section, of a dry solid storage vessel having a level sensing system according to the invention.

A dry solid storage vessel having a level sensing system embodying the invention is illustrated in FIG. 1 and includes a generally cylindrical storage vessel 10 having a conical roof 11 with an inlet port 12 formed in the apex thereof and a frustoconical bottom portion 13 with an outlet port 14 disposed lowermost of the vessel. Vessel 10 can be mounted above the ground for example by a plurality of mounting legs 15. An elongated level sensor 16 is supported within vessel 10 in a position removed from and substantially parallel to the longitudinal axis thereof and extends vertically therein substantially along the entire length of vessel 10. Sensor 16 is supported at its upper end by a mounting assembly 18 secured to the roof 11 of the storage vessel 10. A relatively heavy weight 17 is mounted on the lower end of sensor 16 to assist in the vertical free-hanging alignment of the sensor.

The disposition of the elongated sensor 16 offset from the longitudinal axis and the material inlet 12 of vessel 10 as illustrated in FIG. 1 offers major advantages in system operation. Dry bulk material such as grain loaded via inlet port 12 into vessel 10 forms a peaked or mound like upper surface in the loaded bulk, the particular slope of the upper surface being dependent upon the inherent angle of repose of the loaded material. Elongated sensor 16 enters the bulk in a position approximately midway of the incline upper surface and in a manner that will be explained hereinbelow provides a level indication corresponding to this point at which the sensor enters the bulk. With knowledge of the particular material characteristics contained within vessel 10, the system can be calibrated to provide an accurate level indication as though the bulk contained within the vessel had a flat upper surface. The system can also be calibrated to indicate the volume of material contained within the vessel by similar calculation which takes into account the reposing characteristics of the bulk material. This sensor location further removes the sensor from the high-velocity flume of wearing material and the abrasive and damaging conditions thereof.

The high tensile and shear stresses within the bulk material exhibited, especially during outflow of the material from vessel 10, are lower at positions removed from the vessel sidewalls, and such positioning of sensor 16 enables level sensing to be accomplished in the presence of less severe downward forces. In addition, as material flows out of vessel 10 by way of outlet port 14, the lines of force within the bulk tend to be directed toward the outlet port and free suspension of sensor 16 permits compliant movement of the sensor during material outflow, as illustrated by the dashed line sensor in FIG. 1, thereby markedly reducing the stress applied to the sensor than would occur were the sensor rigidly held within the vessel. Thus, the elongated sensor 16 is supported within vessel 10 in a position less subject to the severe forces encountered within dry bulk materials and mitigate the severe environment in which the sensing system must operate.

Figure 2:
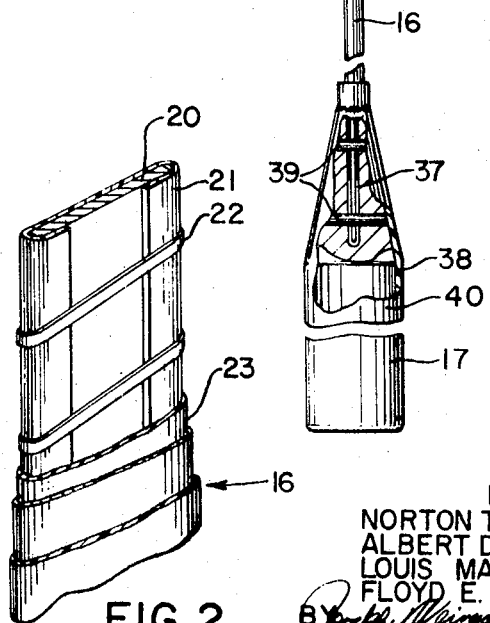
FIG. 2 is a partly cutaway pictorial view of a level sensor embodied in the system according to the invention.

The elongated sensor 16 even in the novel position illustrated, must nevertheless be capable of accurate operation in the presence of extreme environments. The sensor structure is shown in great detail in the above-identified patent and copending application and will be described herein only to the extent necessary for an understanding of this invention. The sensor is depicted in one simplified form in FIG. 2 and includes an electrically conductive base strip 20 of high tensile strength material, which in part is surrounded by an electrically insulative material 21. Insulative material 21 covers one surface of base strip 20 and extends around each edge of the strip and unto a portion of the opposite surface of base strip 20 to define an uninsulated opening along the length of one side of the base strip. A precision resistance wire, which typically is of ribbonlike configuration, is helically wound around the insulated base strip, the portions of resistance wire 22 bridging the exposed uninsulated side of base strip 20 being adapted to contact the respective exposed confronting portions of base strip 20 and to make positive electrical contact therewith. A jacket or sheath 23, which may be formed of multiple layers to suit particular operating requirements, (as set forth in the above identified copending application) closely surrounds the structure which includes the insulated base strip and helically wound resistance wire, the jacket being of high tensile strength and yet sufficiently flexible to be sensitive to surrounding pressure. The jacket is substantially moisture impermeable and, in addition, is resistant to abrasion and high tensile forces over a wide range of environmental temperatures and forces. The inner electrical system of the elongated sensor is therefore protected from the operating environment by the jacket while, in addition the jacket acts as an extremely effective pressure sensitive diaphragm for forcing resistance wire 22 into contact with the exposed surface of base strip 20. Resistance winding 22 is normally maintained in predetermined spaced-apart relationship with the exposed surface of base strip 20 by the physical characteristics of insulation 21. Winding 22 is adapted to contact base strip 20 whenever a predetermined external pressure is applied to the sensor to cause the winding to flex inwardly into contact with the exposed portion of the base strip.

Figure 3:
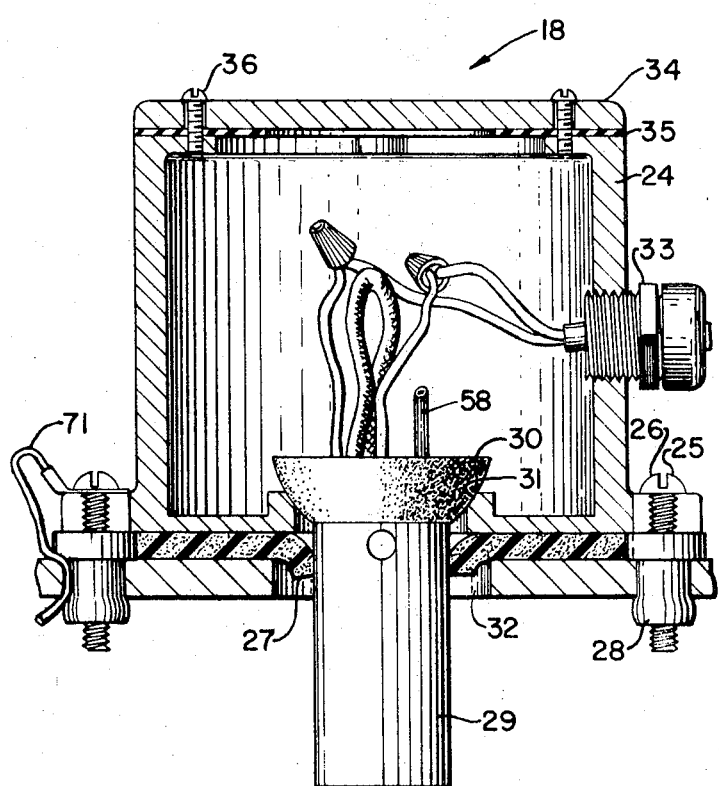
FIG. 3 is an elevation view partly in section of the level sensor mounting assembly according to the invention.

It is a particular feature of the invention that elongated sensor 16 is mounted within the storage vessel in a manner especially adapted to withstand the severe forces and stresses encountered in a dry bulk storage system. One embodiment of a mounting assembly 16 is illustrated in FIG. 3 and includes a sealed housing 24 formed typically of cast aluminum and of generally circular configuration secured to the roof or other mounting surface of a storage vessel by means of mounting flanges 25 and bolts 26. Housing 24 is resiliently secured to the mounting surface by means of a gasket typically made of rubber 27 secured between the housing and its mounting surface and by means of resilient fasteners 28 fitted into the mounting holes provided in the storage tank mounting surface and adapted for threaded engagement with bolts 26. The storage vessel is substantially sealed from the environment by this resilient mounting. Housing 24 can be electrically connected to the vessel for example by means of a wire 71 or housing 24 can be electrically insulated from its mounting surface.

The upper end of sensor 16 is connected to the mounting assembly by means of a collar 29 which is generally cylindrical and which has on the upper end thereof a hemispherical portion 30 which is supported by the chamfered annular surface 31 of the bottom side of housing 24. Collar 29 passes through an opening 32 provided in the vessel mounting surface, this opening being sufficiently large to permit pivotal motion of the collar for reasons to be explained. Collar 29 also passes through a central opening provided in resilient gasket 27 the gasket opening being sized such that intimate contact is maintained between the gasket and the cylindrical wall of collar 29 passing therethrough. In this manner the interior of housing 24 remains substantially sealed against the entry of dust from the vessel interior while pivotal motion of collar 29 and the sensor mounted thereto is freely permitted. Connection to the electrical terminals of the sensor electrical system are made via a cable which passes through a compression-type connector 33 secured in the cylindrical wall of housing 24 and in sealing relationship therewith. Access to the housing interior can be gained by a removable cover 34 secured to the housing by means of a gasket 35 and fasteners such as machine screws 36.

The weight 17 secured to the lower end of sensor 16 is affixed thereto as illustrated in FIG. 3. The lower end of base strip 20 is coated with an epoxy and then covered with an epoxy-impregnated fiberglass cloth 37 which is folded in a U-shaped configuration over the opposing broad surfaces of the base strip. The thus insulated base strip is inserted into the slot provided in the upper end of a stainless steel weight 38 and insulative pins 39 may be inserted through openings provided in the steel weight and in the corresponding portions of the base strip. Any excess fiber glass cloth which extends beyond the slot formed in weight 38 is removed. A smooth covering is then formed around the weight assembly and on to the jacket of the sensor this covering being, for example, formed of heat shrinkable tubing or room temperature curing rubber.

Figure 4:
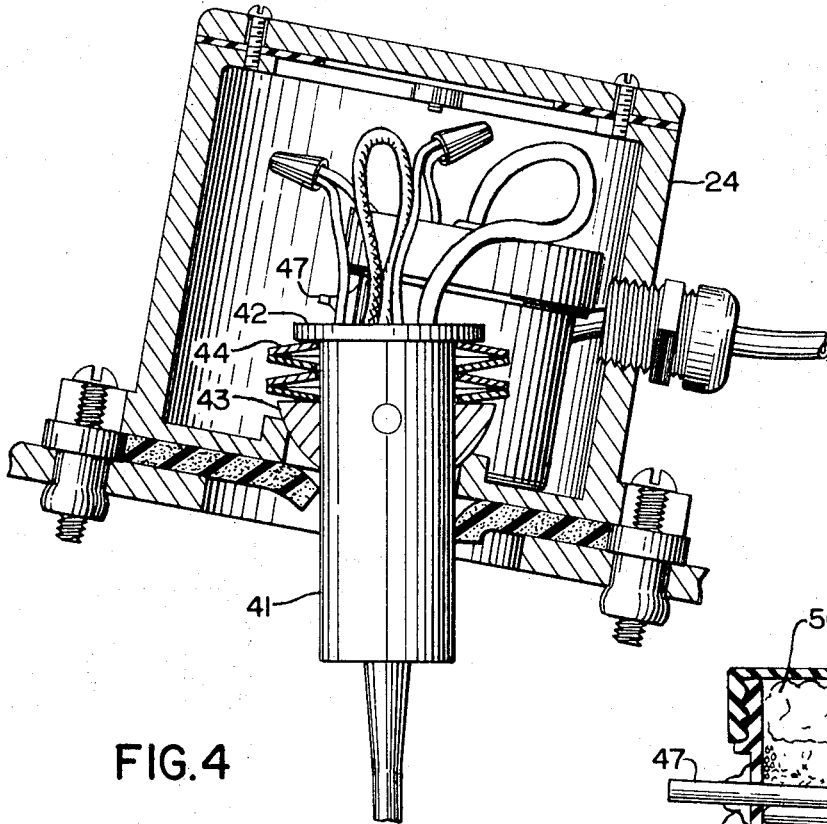
FIG. 4 is an elevation view partly in section of an alternative embodiment of a mounting assembly.

An alternative mounting assembly is illustrated in FIG. 4 which depicts the housing 24 inclined with respect to the elongated sensor such as may be encountered when the sensor is installed on an inclined surface as in FIG. 1. The mounting collar in this embodiment is an elongated cylinder having a circular flange formed on the upper surface thereof. A hemispherical ring 43 is disposed around collar 41 and four spring washers 44 are also disposed around collar 41 and contained between the confronting surfaces of ring 43 and flange 42. Spring washers 44 are arranged to provide a pair of by-convex elements which function as a spring operative to absorb transient forces encountered during system operation. The hemispherical surface of ring 43 confronts the chamfered annular surface provided in housing 24 as described hereinabove and ring 43 is operative to move in relation to the associated chamfered surface. The parameters of the spring formed by spring washers 44 are selected in accordance with particular operating environments such that excessive tensile forces experienced by the elongated sensor will cause compression of the spring thereby permitting vertical compliant movement of the sensor with correspondent lessening of the tensile forces experienced by the sensor. Such spring mounting is especially useful for example in absorbing transient forces such as can be experienced during initial outflow of bulk material from a storage vessel.

Figure 5:
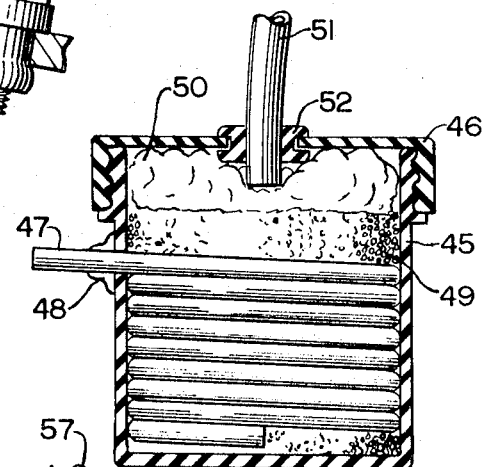
FIG. 5 is a sectional elevational view of an aspirator employed in the present system.

For proper system operation the interior of elongated sensor 16 should be reasonably moisture free and in those instances where the moisture content of the working environment may contaminate the sensor or degrade the electrical contact system, means are provided in the present system for conditioning the environmental atmosphere so that excessive moisture is not introduced into the interior of the sensor. Referring to FIGS. 4 and 5, there is shown a breather coupled between the sensor interior and the working environment and operative to absorb moisture in the gaseous environment entering the sensor. The breather includes a hollow enclosure 45 having a cap 46 threaded thereof and having a capillary breather tube 47 helically disposed therein, one end of the breather tube being within the enclosure and the opposite end of the breathing tube extending through an opening in the enclosure wall to a position outside of enclosure 45. The end of breathing tube 47 extending through enclosure 45 is sealed thereto by a suitable adhesive or sealant 48, enclosure 45 containing coiled breathing tube 47 is filled with a moisture-absorbing material 49 such as silica gel. A layer of cotton batting or other similar porous material 50 serves as a "breathable" retainer to prevent particle motion which might otherwise clog the tube 47. An inlet tube 51 communicates with the interior of enclosure 45 and is supported in sealed relation to the enclosure by means of a grommet 52 or other suitable sealing member, and can be coupled by suitable tubing to a tube 58 which communicates between the interior of sensor 16 and the working environment. The external end of breathing tube 47 communicates with the interior of housing 24 so that in operation air or another gaseous environment entering the enclosure 45 can have moisture chemically removed by material 49 so that relatively clean and moisture free air is introduced into the sensor. Equalization of pressure within the sensor interior and the working environment is also achieved since the sensor interior is communicative with its environment by way of the aspirator. The capillary breather tube 47 preferably can have an internal volume approximately equal to the internal volume of the sensor, with the result that during system operation little or no external air is drawn into the sensor interior.

Figure 6:
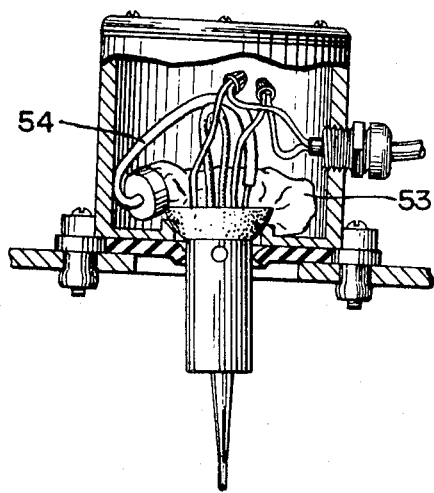
FIG. 6 is a sectional elevation view of a system-mounting assembly having a pressure equalizing container.

In some instances pressure differentials experienced by the sensor during operation are relatively low so that a sealed system can be employed; that is, one in which the sensor interior does not communicate directly with the working environment. Such a sealed system is illustrated in FIG. 6 wherein a sealed bag 53 is shown connected to the sensor interior by a tube 54 coupled to sensor tube 58. A moisture-absorbing material is contained within bag 53 to absorb any residual moisture as required. Bag 53 is of sufficient volume to permit accommodation of the differential pressures experienced by the sensor and prevents contaminating ingredients from entering the sensor interior.

Figure 7:
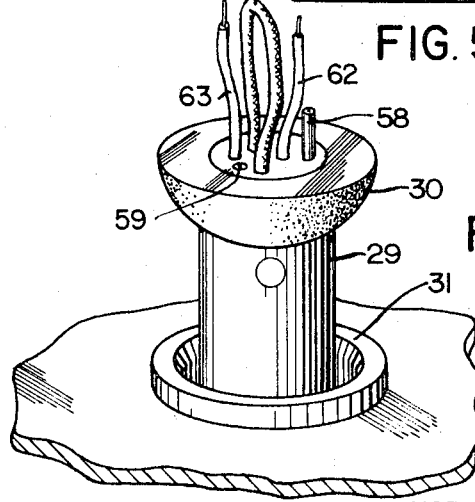
FIG. 7 is a pictorial view of the sensor mounting collar.
Figure 8:
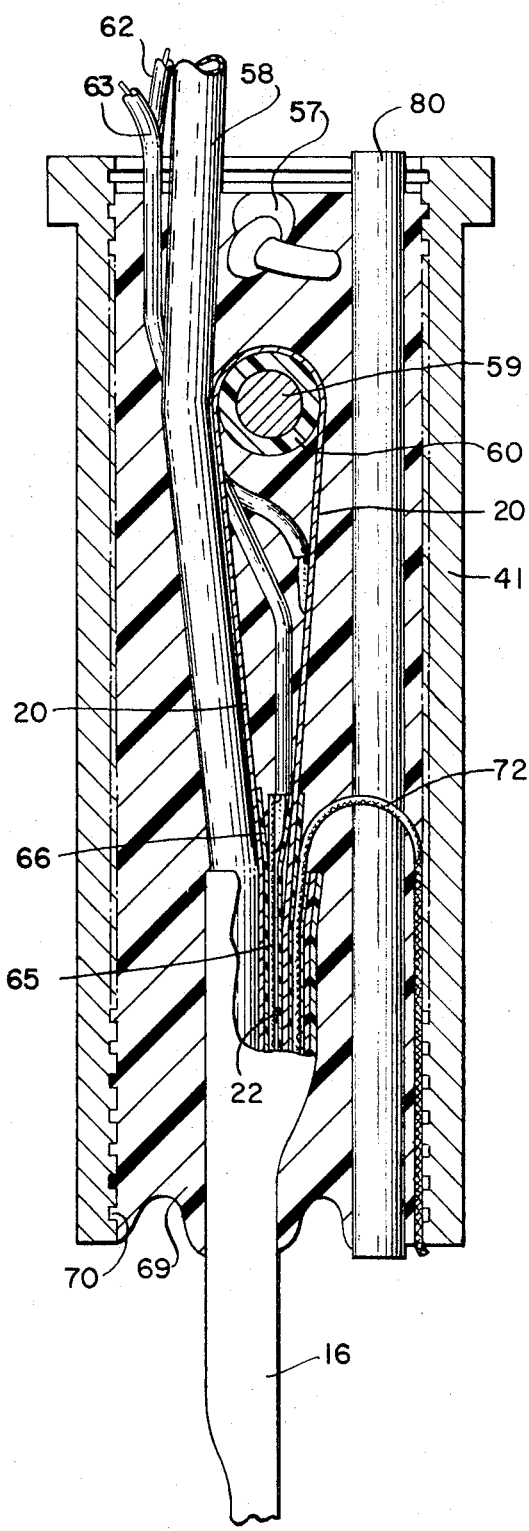
FIG. 8 is a sectional elevation view illustrating connection of the level sensor to the mounting collar.
Figure 9:
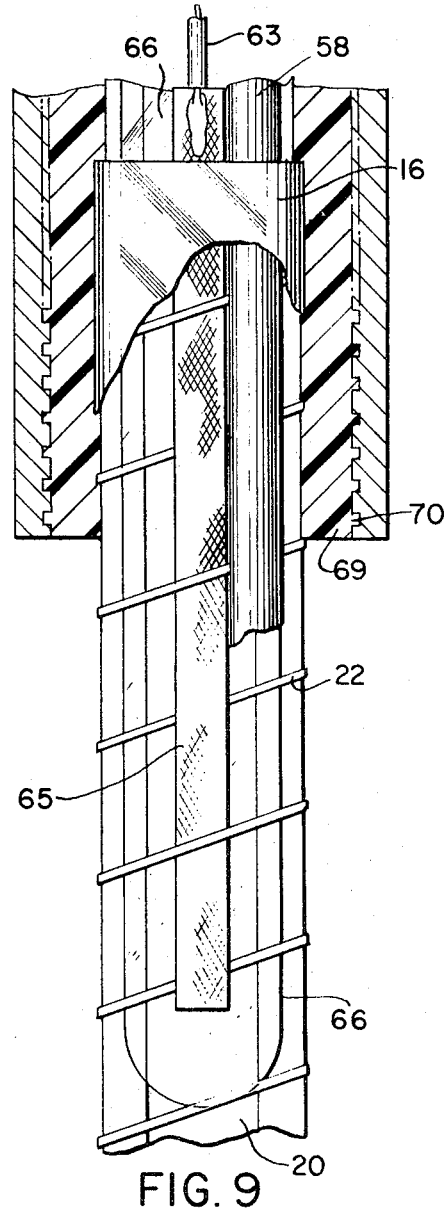
FIG. 9 is a sectional elevational view illustrating further connection of the level sensor to its mounting collar.

The sensor terminations and their connection in the system are seen more completely in FIGS. 7, 8 and 9. In FIG. 7, there is shown first and second electrical leads 62 and 63, one lead being electrically connected to the sensor base strip while the other lead is electrically connected to the resistance element. A handle 57 of rope or other suitable material is rigidly secured to the mounting column to provide a means of lifting the sensor and for positioning it within a storage vessel. A breathing tube 58 communicates between the interior of the sensor and the working environment and can be connected to the breathing bag 53 or to the breather as described above. The hemispherical surface of mounting collar 29 can be roughened to selected degrees to provide selected resistance to pivotal motion of the sensor during minor variations in the forces encountered in a storage system but not sufficient resistance to pivotal motion upon forces of predetermined magnitude.

Referring to FIG. 8, attachment of the sensor to the mounting collar of the type shown in FIG. 4 is depicted. A steel mounting pin 59 having an insulated sleeve 60 formed therearound is disposed diametrically through mounting collar 41 and the base strip 20 is looped around the insulated mounting pin 59 and is brought back into the upper portion of the sensor. Electrical connection is made to base strip 20 by a lead wire 62 which is connected to base strip 20 and which extends out through the upper end of mounting collar 41. Connection is made to the resistance wire by a lead connected at one end thereto at the other end of which extends outwardly of the top of mounting collar 41. Connection from lead 63 is made to resistance wire 22 by means of a flat woven conductive braid 65 inserted over and under the resistance wires to provide intimate electrical connection therewith. The sensor lead 63 is soldered to the upper end of braid 65 as illustrated more clearly in FIG. 9 which depicts the sensor at right angles to the view of FIG. 8. Braid 65 is insulated from the exposed surface of base strip 20 by an insulative tape 66 which typically is Mylar disposed beneath resistance wire 22 and extending beyond the upper and lower extremities of conductive braid 65. A vent tube 58 typically formed of plastic is disposed with its lower end in the interior of the sensor jacket with its upper end extending outwardly from the top of collar 41, the upper end being adapted for connection to a capillary breather as described. A second vent tube 80 can be provided which communicates between the upper and lower extremities of the mounting collar 41 to provide communication between the mounting housing 24 and the vessel interior when such communication is DESIRED in a particular operating environment. The ends of lifting desired 57 are knotted beneath the upper plate of the mounting collar and the entire interior of collar 41 is encapsulated with an epoxy 69 which further rigidly supports the sensor on the mounting collar and seals the sensor and its associated connections from the environment. Bonding between the epoxy 69 and the interior of mounting collar 41 is further enhanced by providing serrations 70 on the interior surface of collar 41.

In the illustrated embodiment the level sensor 16 is electrically shielded by means of a metallized layer provided as part of the outer sheath 23. Typically a layer of Mylar or other suitable material is employed having an aluminized inner surface and, as illustrated in FIG. 8, a grounding braid 72 mechanically contacts the aluminized surface, the other end of the braid contacting the interior surface of collar 41.

From the foregoing it is evident that a system has been provided in which the level of dry solid materials can be repeatedly and accurately determined in the presence of unusual forces exhibited by such materials stored in vessels. Various modifications and alternative implementations will now occur to those versed in the art without departing from the spirit and true scope of the invention and it is not intended to limit the invention by what has been particularly shown and described.

We claim:

1. For use in a dry bulk storage vessel in which the level of dry bulk material contained therein is to be determined, a level-sensing system comprising:
   an elongated level sensor operative to provide a resistance the magnitude of which varies in direct relation to the level of material surrounding the sensor, said sensor being adapted for free-hanging disposition within said material;
   means for mounting said level sensor within said material in a position offset from the inlet axis of said storage vessel and displaced from the sidewall of said vessel, said means including
   a mounting assembly adapted to be secured to said vessel and attached to the upper end of said sensor and operative to support said sensor in said material;
   means for equalizing pressure variations between the interior of said sensor and the environment while preventing moisture from entering the sensor interior; and
   a weight rigidly secured to the lower end of said sensor and operative to assist in the free-hanging alignment thereof.

2. For use in a dry bulk storage vessel in which the level of dry bulk material contained therein is to be determined, a level-sensing system comprising:
   an elongated level sensor operative to provide a resistance the magnitude of which varies in direct relation to the level of material surrounding the sensor, said sensor being adapted for free hanging disposition within said material;
   means for mounting said level sensor within said material in a position offset from the inlet axis of said storage vessel and displaced from the sidewall of said vessel, said means including
   a mounting assembly adapted to be secured to said vessel and attached to the upper end of said sensor and operative to support said sensor in said material;
   means for equalizing pressure variations between the interior of said sensor and the environment while preventing moisture from entering the sensor interior; and wherein said mounting assembly includes:
   a housing having a bearing surface formed therein;
   a collar pivotally mounted on said bearing surface and rigidly connected to the upper end of said level sensor;
   means for sealingly mounting said assembly to a mounting surface of said vessel;
   means for coupling the electrical output of said sensor to utilization circuitry;
   means communicating between the sensor interior and the interior of said housing; and
   spring means disposed in said housing and operative to lessen transient forces encountered during system operation.

3. A level-sensing system according to claim 2, wherein said level sensor includes:
   a high tensile strength electrically conductive base strip;
   an electrical insulative material partially surrounding said base strip to define an uninsulated opening along the length of one side of said base strip;
   a precision resistance wire helically wound around the insulated base strip, the portions of the wire bridging the uninsulated opening being adapted to contact respective exposed confronting portions of the base strip in the presence of surrounding pressure; and
   a flexible multilayer jacket of high tensile strength surrounding the insulated base strip and resistance wire, said jacket being sensitive to surrounding pressure while being substantially impermeable to moisture.

4. A level-sensing system according to claim 3 wherein said jacket includes a metallized layer and means for electrically connecting the metallized surface of said layer to electrical ground.

5. A level-sensing system according to claim 3 wherein said mounting assembly includes:
   a housing having an opening in the bottom face thereof and a bearing surface formed in said opening;
   a collar having an upper hemispherical portion cooperative with said bearing surface for providing pivotal movement thereon and a generally cylindrical portion surrounding the upper end of said sensor, said collar having
   an electrically insulated pin for securing said base strip to said collar;
   first and second wires connected respectively to said resistance wire and to said base strip; and
   an encapsulant securing said sensor within said collar.

6. A level sensing system according to claim 5 wherein said collar further includes a tube disposed therein and communicating between the interior of said sensor and the interior of said housing.

7. A level sensing system according to claim 5 wherein said collar further includes a first tube disposed therein and communicating between the interior of said sensor and the interior of said housing; and a second tube disposed within said collar and communicating between the interior of said housing and the interior of said storage vessel.

8. For use in a dry bulk storage vessel in which the level of dry bulk material contained therein is to be determined, a level-sensing system comprising:
   an elongated level sensor disposed along substantially the full height of said storage vessel and operative to provide a resistance the magnitude of which varies in direct relation to the level of material surrounding the sensor, said sensor being adapted for and having sufficient weight to permit free hanging disposition within said material;
   means for mounting said level sensor within said material in a position offset from the inlet axis of said storage vessel and displaced from the sidewall of said vessel, said means including
   a mounting assembly adapted to be secured to said vessel and attached to the upper end of said sensor and operative to support said sensor in said material, said mounting assembly including
   a housing having a bearing surface formed on one face thereof;

a collar rigidly secured to the upper end of said level sensor and having an upper portion cooperative with said bearing surface to permit pivotal movement of said collar and sensor;

means for sealingly mounting said housing to a mounting surface of said vessel;

means for coupling the electrical output of said sensor to utilization circuitry; and means communicating between the sensor interior and the interior of said housing; and means for equalizing pressure variations between the interior of said sensor and the environment while preventing moisture from entering the sensor interior.

9. A level sensing system according to claim 8 wherein said means for equalizing pressure variations includes a breather coupling the interior of said sensor and the interior of said housing.

10. A level sensing system according to claim 9 wherein said breather includes:

an enclosure having a moisture-absorbing material disposed therein;

a capillary breather tube disposed within said enclosure and having one end terminating within said enclosure and an opposite end terminating exteriorly of said enclosure; and a tube coupling the interior of said enclosure with the interior of said sensor.

11. A level-sensing system according to claim 10 wherein said capillary breather tube has an internal volume approximately equal to the internal volume of said sensor.

12. A level sensing system according to claim 8 wherein said means for equalizing pressure variations includes a sealed bag containing moisture absorbing material and coupled to the interior of said sensor, said bag being of sufficient volume to accommodate differential pressures experienced by said sensor.

13. For use in a dry bulk storage vessel in which the level of dry bulk material contained therein is to be determined, a level-sensing system comprising:

an elongated level sensor operative to provide a resistance the magnitude of which varies in direct relation to the level of material surrounding the sensor, said sensor being adapted for free-hanging disposition with said material;

means for mounting said level sensor within said material in a position offset from the inlet axis of said storage vessel and displaced from the sidewall of said vessel, said means including a mounting assembly adapted to be secured to said vessel and attached to the upper end of said sensor and operative to support said sensor in said material;

means for equalizing pressure variations between the interior of said sensor and the environment while preventing moisture from entering the sensor interior; and wherein said mounting assembly includes:

a sealed housing having a bearing surface on one face thereof;

a collar rigidly secured to the upper end of said level sensor and having an upper portion cooperative with said bearing surface to permit pivotal movement of said collar and sensor;

a sealed connector mounting in a wall of said housing for coupling the electrical output of said sensor to utilization means.

UNITED STATES PATENT OFFICE
CERTIFICATE OF CORRECTION

Patent No. 3,583,221                  Dated June 8, 1971

Inventor(s) Albert D. Ehrenfried, Norton T. Pierce, Louis Mager, Floyd E. Halstead It is certified that error appears in the above-identified patent and that said Letters Patent are hereby corrected as shown below:

Column 2, line 64, after "moisture" insert --and retains the properties of high tensile strength, rupture--.

Column 7, line 13, "DESIRED" should be --desired--.

Column 7, line 14, "desired" should be --handle--.

Column 10, line 10, "with" should be --within--.

Signed and sealed this 28th day of March 1972.

(SEAL)
Attest:

EDWARD M. FLETCHER, JR.          ROBERT GOTTSCHALK
Attesting Officer                Commissioner of Patents